(12) United States Patent
Zawisza

(10) Patent No.: US 12,473,936 B2
(45) Date of Patent: Nov. 18, 2025

(54) TWIN CHAMBER AIR DRYER AND PNEUMATIC SYSTEM

(71) Applicant: ZF CV SYSTEMS EUROPE BV, Brussels (BE)

(72) Inventor: Adam Zawisza, Wroclaw (PL)

(73) Assignee: ZF CV SYSTEMS EUROPE BV, Brussels (BE)

( * ) Notice: Subject to any disclaimer, the term of this patent is extended or adjusted under 35 U.S.C. 154(b) by 791 days.

(21) Appl. No.: 17/851,299

(22) Filed: Jun. 28, 2022

(65) Prior Publication Data

US 2022/0412382 A1    Dec. 29, 2022

(30) Foreign Application Priority Data

Jun. 28, 2021    (EP) .................................... 21181963

(51) Int. Cl.
| | | |
|---|---|---|
| F15B 21/048 | (2019.01) | |
| F15B 21/00 | (2006.01) | |
| F15B 21/044 | (2019.01) | |

(52) U.S. Cl.
CPC .......... *F15B 21/048* (2013.01); *F15B 21/008* (2013.01); *F15B 21/044* (2013.01);
(Continued)

(58) Field of Classification Search
CPC .... F15B 21/048; F15B 21/008; F15B 21/044; F15B 2211/327; F15B 2211/6306; F15B 2211/8855
(Continued)

(56) References Cited

U.S. PATENT DOCUMENTS 4,936,026 A * 6/1990 Cramer ................ B01D 53/261
                                                         34/562
5,522,150 A * 6/1996 Schultz ................ B60T 17/004
                                                         34/80
(Continued)

FOREIGN PATENT DOCUMENTS

CN        104321233 A        1/2015
CN        115899027 A  *    4/2023   ............ B60T 17/004
(Continued)

OTHER PUBLICATIONS

Machine assisted English translation of DE102013207570A1 obtained from https://patents.google.com/patent on Jun. 27, 2022, 5 pages.
(Continued)

*Primary Examiner* — Stephen M Gravini
(74) *Attorney, Agent, or Firm* — WARNER NORCROSS + JUDD LLP

(57) ABSTRACT

A twin chamber air dryer for a pneumatic system of a commercial vehicle comprises: a supply inlet port, a supply outlet, a compressor control outlet, and an exhaust outlet; a first desiccant cartridge and a second desiccant cartridge, to be operated alternately; a toggling valve assembly for switching between the first and second desiccant cartridges; a pneumatically controlled purge valve switchable between a blocking basic position and an activated position; and a solenoid valve assembly. The solenoid valve assembly comprises a directional control solenoid valve for receiving an electrical direction control signal and controlling the toggling valve assembly, a regeneration solenoid valve for receiving an electrical regeneration control signal and providing pressurized air in regeneration phases of the desiccant cartridge, and a governor solenoid valve for receiving an electrical governor control signal and controlling the purge valve and a compressor mode.

14 Claims, 1 Drawing Sheet

(52) U.S. Cl.
CPC . *F15B 2211/327* (2013.01); *F15B 2211/6306* (2013.01); *F15B 2211/8855* (2013.01)

(58) Field of Classification Search
USPC .......................................................... 34/566
See application file for complete search history.

(56) References Cited

U.S. PATENT DOCUMENTS

| | | | | |
|---|---|---|---|---|
| 5,581,903 | A * | 12/1996 | Botich | F26B 21/083 |
| | | | | 96/144 |
| 5,899,435 | A * | 5/1999 | Mitsch | F16K 25/00 |
| | | | | 251/282 |
| 5,930,910 | A * | 8/1999 | Trapp | B01D 53/261 |
| | | | | 34/80 |
| 6,148,535 | A * | 11/2000 | Porter | B01D 53/261 |
| | | | | 34/80 |
| 6,785,980 | B1 * | 9/2004 | Koelzer | B60T 17/004 |
| | | | | 34/69 |
| 6,858,066 | B2 * | 2/2005 | Quinn | F15B 21/048 |
| | | | | 96/147 |
| 7,032,325 | B2 * | 4/2006 | Walker | B01D 53/261 |
| | | | | 34/527 |
| 7,100,305 | B2 * | 9/2006 | Hoffman | B60T 17/004 |
| | | | | 96/147 |
| 7,103,991 | B2 * | 9/2006 | Moulding | B60T 17/004 |
| | | | | 34/330 |
| 11,300,144 | B2 * | 4/2022 | Chamot | B60T 17/004 |
| 2012/0325327 | A1 | 12/2012 | Eggebrecht et al. | |
| 2017/0361822 | A1 | 12/2017 | Czapiewska et al. | |
| 2018/0320716 | A1 | 11/2018 | Reidi et al. | |
| 2022/0412382 | A1 * | 12/2022 | Zawisza | B01D 53/047 |

FOREIGN PATENT DOCUMENTS

| | | | |
|---|---|---|---|
| DE | 102013207570 A1 | 10/2014 | |
| DE | 102015118744 A1 | 5/2017 | |
| EP | 2829744 A2 | 1/2015 | |
| EP | 4112399 B1 * | 1/2024 | ............ B60T 17/004 |
| WO | 2017050408 A1 | 3/2017 | |

OTHER PUBLICATIONS

Machine assisted English translation of WO2017050408A1 obtained from https://patents.google.com/patent on Jun. 27, 2022, 9 pages.

Machine assisted English translation of CN104321233A obtained from https://worldwide.espacenet.com/patent on May 29, 2025, 24 pages.

Machine assisted English translation of EP2829744A2 obtained from https://worldwide.espacenet.com/patent on May 29, 2025, 16 pages.

* cited by examiner

TWIN CHAMBER AIR DRYER AND PNEUMATIC SYSTEM

CROSS-REFERENCE TO RELATED APPLICATIONS

This application claims priority to and all advantages of European Patent Application No. 21181963.6, filed on 28 Jun. 2021, the contents of which are hereby incorporated by reference.

FIELD OF THE INVENTION

The invention relates to a twin chamber air dryer for a pneumatic system of a commercial vehicle and a pneumatic system comprising a twin chamber air dryer.

BACKGROUND OF THE INVENTION

Pneumatic systems of commercial vehicles in general comprise a compressor driven by an engine shaft of the vehicle engine and an air dryer device for drying or dehumidifying the compressed air supplied by the compressor.

The air dryer therefore receives the compressed air from the compressor, dehumidifies it by means of replaceable desiccant cartridges and delivers the dried, compressed air in on-load phases (supply phases) to consumer circuits, in particular by means of a multi circuit protection valve connected to the air dryer.

The desiccant cartridges are regenerated only in pumping phases, in which dried, compressed air from the line behind one of the desiccant cartridges is guided in reverse direction through the second desiccant cartridge to an exhaust of the air dryer. In general, these regeneration phases are time-controlled.

Further a mechanical governor valve is provided for controlling the system pressure provided by the air dryer and stopping further supply when reaching a cut-out pressure, in order to prevent the pneumatic system from overpressure by the purge valve activating. In addition, the mechanical governor is realized by a valve devices and outputs a pneumatic signal to a compressor head of the compressor, which compressor head comprises a valve for switching the compressor into an off-load mode thereby stopping the air supply to the air dryer.

Cut-out pressures provided by a mechanical governor are generally fixed by the internal specific valve equipment of the governor, which is a drawback of such a prior art assembly.

In order to provide a relatively constant air supply even in regeneration phases, twin chamber air dryers are known which comprise two desiccant cartridges to be operated in an alternating manner. Thus, one desiccant cartridge can be regenerated when the other desiccant cartridge is in its supply phase for dehumidifying the supplied compressed air. In general, a toggling valve assembly is provided for switching or toggling the compressed air from a supply inlet port of the twin chamber air dryer to either a first air dryer line with the first desiccant cartridge or a second air dryer line with the second desiccant cartridge. Check valves or non-return valves are provided in order to connect the air dryer lines to a common supply outlet and a common regeneration line.

However, one disadvantage of the prior art is an interaction of the air streams of the two air dryer lines. The regeneration air stream in one of the air dryer lines reduces the supply air flow provided by the other air dryer line during its on-load phase.

The control of the on-load phases and regeneration phases are often realized by a timer element, which initiates and stops these phases according to preset time intervals. However, such a time-control with fixed time intervals does not permit a higher flexibility according to the current air demand and air consumption.

Furthermore, the initial starting phase of the compressor can be problematic, since the internal pneumatic channels in the twin chamber air dryer are not yet pressurized and therefore cannot provide the internal pressure signals for controlling the pneumatically controlled valves. Thus, during a starting phase (pump-up phase) of the compressor, twin chamber air dryer systems tend to toggle or switch between a first and second supply phase, in which the air is transmitted through the first or second desiccant cartridge, respectively.

BRIEF SUMMARY OF THE INVENTION

An object of the invention is to provide a twin chamber air dryer for a pneumatic system of a commercial vehicle and a pneumatic system comprising such a twin chamber air dryer which enable a flexible, safe and energy-efficient operation.

This object is realized by the twin chamber air dryer of the invention. Furthermore, a pneumatic system comprising a twin chamber air dryer, and a commercial vehicle comprising a pneumatic system are provided.

The inventive twin chamber air dryer comprises at least four pneumatic ports, which are a supply inlet port to be connected to a compressor or an external source of compressed air, a supply outlet for supplying dried compressed air to a pneumatic consumer system, a compressor control outlet for delivering a compressor pressure signal to said compressor, and an exhaust outlet.

Further, the twin chamber air dryer comprises a first and a second desiccant cartridge, which are preferably replaceable, a toggling valve assembly for switching between said first and second desiccant cartridge, a purge valve, and a solenoid valve assembly. Furthermore, additional means like a safety valve, non-return valves and a heater can be provided.

The solenoid valve assembly comprises three solenoid valves, which are a direction control solenoid valve, a regeneration solenoid valve, and a governor solenoid valve. All three solenoid valves can be independently controlled by an electronic control unit, thereby enabling a separation of the individual on-load phases (supply phases) and regeneration phases of the respective desiccant cartridge. Further, the compressor can be switched by the governor solenoid valve, thus facilitating to control the compressor independently of the on-load phases and regeneration phases of the desiccant cartridges. By realizing the compressor control independently of the control of the desiccant cartridges, an energy-efficient operation is possible; further, a starting phase of the twin chamber air dryer is improved.

This feature of an electrically controlled solenoid valve assembly with the above mentioned three solenoid valves enables the benefit of an individual operation, wherein in the air supply provided by one desiccant cartridge is not reduced by the regeneration phase of the other desiccant cartridge. Further, this assembly is energy-efficient, since the regeneration phase can be controlled independently of the on-load phase of the other desiccant cartridge.

The purge valve is provided for connecting the supply inlet port to the exhaust outlet; it comprises a blocking basic position and is activated by the governor solenoid valve. The governor solenoid valve is electrically controlled by the governor control signal and outputs a pneumatic control signal fed to the pneumatic unloader control port of the compressor; further the pneumatic control signal is preferably fed to the pneumatic control port of the purge valve. Thus, by activating the governor solenoid valve, the compressor is switched into its off-load mode and the purge valve is switched into its activated position, in which it prevents an additional supply of compressed air from the compressor.

This combined control process, i.e. stopping the compressor and switching the purge valve, provides the inventive advantage, that a supply of additional compressed air can be stopped immediately. Stopping the compressor only does not necessarily block the supply of compressed air, since the compressor, depending on the type, can still supply some air flow in its idle mode even after receiving the pneumatic unloader control signal at least for a specific running down period.

The direction control solenoid valve controls the toggling valve assembly and switches the toggling valves between their respective positions. The regeneration solenoid valve is provided for initiating a regenerating phase; thus, the direction control solenoid valve defines, which of the desiccant cartridges can be operated in the regeneration phase initiated by the regeneration solenoid valve.

Therefore, the on-load phase and the regeneration phase of each desiccant cartridge can be individually controlled, independently of the other desiccant cartridge. In particular, a regeneration phase of one desiccant cartridge can be started even in a compressor off-load mode, in which the other air dryer line is not providing compressed air to the common supply outlet. The pressure for the regeneration phases can be taken from the pneumatic system or consumer circuits behind the twin chamber air dryer.

According to one embodiment, the solenoid valve assembly provides not only on-load phases and regeneration phases, but also passive phases of each desiccant cartridge, in which no through-flow of air through the desiccant cartridge, neither in its supply direction nor its regeneration direction, is provided. This reduces the energy consumption of the twin chamber air dryer by avoiding unnecessary operation.

According to one embodiment an additional safety valve is provided, which releases the pressure supplied by the compressor to the supply inlet port and therefore protects the pneumatic system against overpressure coming from the compressor, in particular sudden and unexpected overpressure. The safety valve and the purge valve both are preferably connected between the supply inlet and an exhaust; however, the safety valve is in particular not switched by a control signal but it opens above a specific safety valve pressure value.

According to one embodiment the toggling valve assembly comprises a first and a second toggling valve, for switching a first air dryer line with the first desiccant cartridge and a second air dryer line with the second desiccant cartridge into an on-load phase (supply phase) or a regeneration phase.

The toggling valve assembly preferably comprises a first toggling valve, which is pneumatically controlled by the direction control solenoid valve, and a pneumatically controlled second toggling valve, wherein the toggling valves are preferably 3/2 valves. The first toggling valve is preferably provided between the supply inlet and the first air dryer line with the first desiccant cartridge; in its blocking position it is preferably exhausting the first air dryer line in order to enable a regeneration phase of the first desiccant cartridge; in its open position it enables an on-load phase of the first desiccant cartridge. In the same way, the second toggling valve is switchable in order to enable an on-load phase and a regeneration phase of the second desiccant cartridge.

By pneumatically controlling via direction solenoid valve only the first toggling valve, and pneumatically controlling the second toggling valve by a pressure at the first desiccant cartridge and/or provided by the first toggling valve, a safe operation of the toggling valve assembly is realized, thereby avoiding conflicts between the respective phases of the desiccant cartridges.

According to one embodiment, at least one of said solenoid valves is an electrically controlled 3/2 valve, being connected with its electrical control port to said supply outlet and biased into its blocking basic position. In particular, all three solenoid valves are 3/2 valves, which facilitates a cheap and standardized manufacturing and assembling.

According to one embodiment the pneumatic valve equipment is provided in a first casing and the solenoid valve assembly is provided in a second casing. Thus the solenoid valves can be assembled in a separate casing, thereby facilitating the use of common parts and an exchange and flexible use for different first casings and second casings. Further the safety is enhanced by separating the solenoid valves from the pneumatic valve system. The second casing can be fixed to the first casing, realizing a stable assembly, wherein pneumatic connections between the first casing and the second casing are realized by openings in said casings and sealings between said casings. Thus additional pneumatic plumbing between the casings can be avoided, which reduces the costs and enhances the safety.

The compressor is preferably switchable between an on-load mode and an off-load mode, wherein the off-load mode can be e.g. a switched-off mode, in which the compressor is switched off, or an idle mode of the compressor.

BRIEF DESCRIPTION OF THE DRAWINGS

The invention is explained in more detail by means of preferred embodiments, wherein.

DETAILED DESCRIPTION

Figure 1:
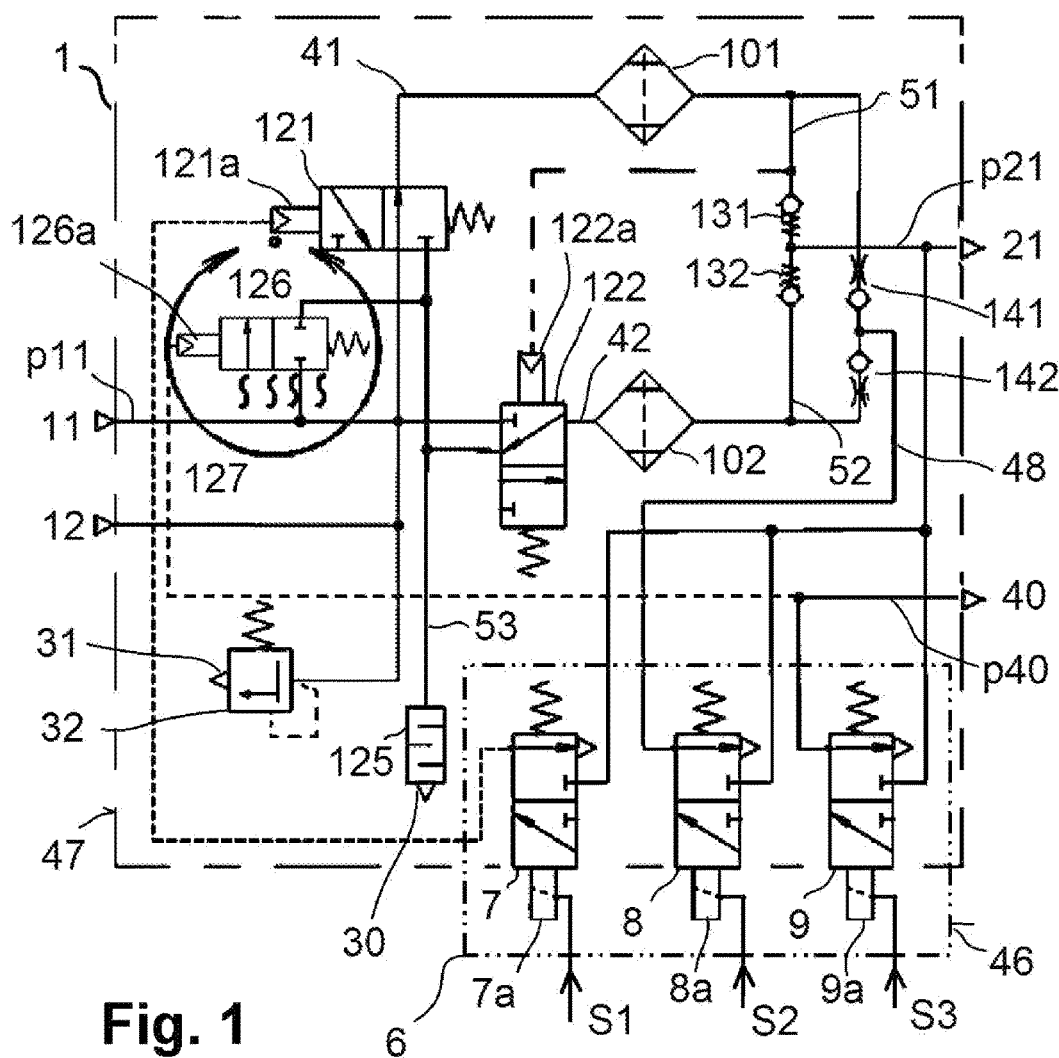
FIG. 1 is a block diagram of a twin chamber air dryer for a pneumatic system of a commercial vehicle according to an embodiment of the invention.
Figure 2:
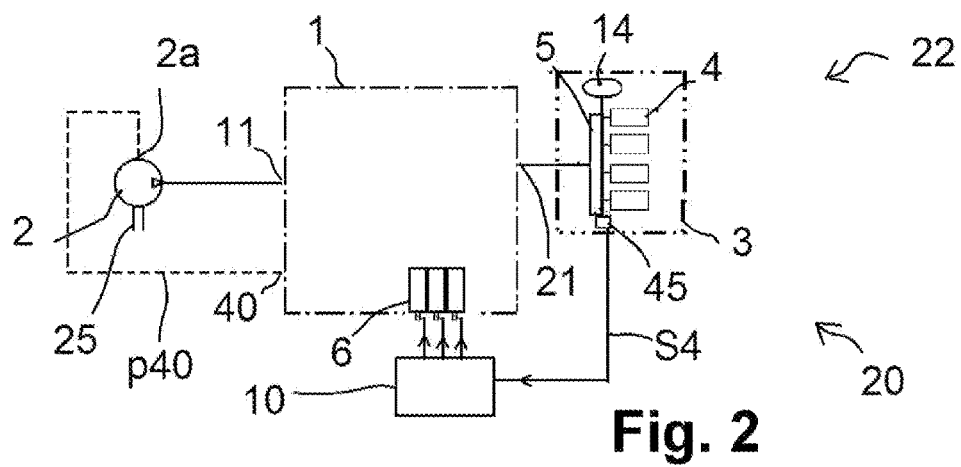
FIG. 2 depicts a pneumatic system of a commercial vehicle including the device of FIG. 1, according to an embodiment of the invention.

A first embodiment example of the invention is described below by means of FIGS. 1 and 2. A commercial vehicle 20 includes a pneumatic system 22, which comprises a compressor 2 connected to an engine shaft 25 of a combustion engine of the commercial vehicle 20, a twin chamber air dryer 1, an ECU (Electronic Control Unit) 10 for controlling the twin chamber air dryer 1, and a pneumatic consumer system 3 connected to the twin chamber air dryer 1; said pneumatic consumer system 3 comprises a multi circuit protection valve assembly 5, consumers circuits 4 and an alternative system pressure storage 14.

The twin chamber air dryer 1 comprises:
a supply inlet port 11 connected to the compressor 2, an supply outlet 21 for supplying the multi circuit protection valve assembly 5 and the consumer circuits 4 with dried compressed air, an external fill port 12, an exhaust outlet 30 a safety valve outlet 31, and a compressor control outlet 40, which feeds a pneumatic signal into an unloader port 2*a* of the compressor 2, for switching the compressor 2 between an on-load mode (active mode) and an off-load mode (inactive mode).

Furthermore, the twin chamber air dryer 1 comprises a solenoid valve assembly 6, which is explained below.

In its on-load mode the compressor 2 is supplying pressurized air; in its off-load mode the compressor 2 can in particular be switched OFF or be provided an idle mode.

The ECU 10 outputs electrical control signals S1, S2, S3 to the solenoid valve assembly 6. Further the ECU 10 receives an electrical pressure control signal S4 from a pressure sensor 45 for sensing a system pressure p21. The pressure sensor 45 is provided at the supply outlet 21 or in the pneumatic consumer system 3 connected to the supply outlet 21, for example in one of the consumer circuits 4 connected to the multi circuit protection valve assembly 5.

The solenoid valve assembly 6 includes a direction control solenoid valve 7 for receiving an electrical direction control signal S1, a regeneration solenoid valve 8 for receiving an electrical regeneration control signal S2, and a governor solenoid valve 9 for receiving an electrical governor control signal S3.

The twin chamber air dryer 1 comprises a first dryer line 41 with a first desiccant cartridge 101 and a second dryer line 42 with a second desiccant cartridge 102, wherein the desiccant cartridges 101, 102 are operated alternately. A toggling valve assembly 121, 122 is provided for switching between the dryer lines 41, 42. The first and second toggling valve 121, 122 are pneumatically controlled 3/2 valves, for switching the supply inlet port 11 to either the first desiccant cartridge 101 or the second desiccant cartridge 102. In the basic state shown in FIG. 1 the first toggling valve 121 remains in its open position for connecting the supply inlet port 11 to the first desiccant cartridge 101, which provides dried pressurized air into a first outlet line 51. The pneumatic control port 122*a* of the second toggling valve 122 is connected to the first outlet line 51, thereby keeping the second toggling valve 122 in its blocking position when the first outlet line 51 is pressurized. Contrary, when the first outlet line 51 is not pressurized, the second toggling valve 122 switches into its open basic position, thereby connecting the supply inlet port 11 to the second desiccant cartridge 102 and pressurizing a second outlet line 52. The first and second outlet line 51, 52 are connected via non-return valves 131, 132 to the supply outlet 21.

Pressure control of the first toggling valve 121 is realized by the direction control solenoid 7 of the solenoid valve assembly 6 via a pneumatic control port 121*a*.

In its non-activated basic position the direction control solenoid valve 7 separates the supply outlet 21 from a pneumatic control port 121*a* of the first toggling valve 121; therefore the first toggling valve 121 remains in its open basic position, thereby keeping the second toggling valve 122 in its blocking position, as described above. When the ECU 10 outputs the electrical direction control signal S1, i.e. S1=1, the direction control solenoid valve 7 is switched into its activated open position, thereby connecting the supply outlet 21 to the pneumatic control port 121*a* and switching the first toggling valve 121 into its activated blocking position, in which the first air dryer line 41 is connected to the exhaust line 53, which is connected to the exhaust outlet 30 via a silencer 125.

In its blocking position, the second toggling valve 122 connects the second air dryer line 42 to the exhaust line 53 and the exhaust outlet 30.

Thus the electrical direction control signal S1 enables a toggling or switching between the operation via the first desiccant cartridge 101 and via the second desiccant cartridge 102, which are therefore operated in an alternating manner.

The respective non-active (passive) desiccant cartridge 101, 102 can be operated either in a passive phase (off phase) or in a regeneration phase. When the electrical regeneration control signal S2 is off, i.e. S2=0, the regeneration solenoid valve 8 is blocking the connection from the supply outlet 21 to a check valve assembly 141, 142, which connects a regeneration line 48 to the output of the desiccant cartridges 101, 102. When S2=0, no regeneration phase is started, and the non-active desiccant cartridge 101 or 102 is in its passive phase. When S2=1, the regeneration solenoid valve 8 switches into its open position and connects the supply outlet 21 to the regeneration line 48, and therefore, the regeneration check valve 141 or 142 of the non-pressurized outlet line 51 or 52 opens and fills the respective outlet line 51 or 52 with the pressurized air provided at the supply outlet 21, thus starting a first regeneration phase of the first desiccant cartridge 101 or a second regeneration phase of the second desiccant cartridge 102 depending on the position of the first and second toggling valve 121, 122.

This pressurized air provided at the supply outlet 21 can therefore be delivered by the other outlet line, i.e. by the second outlet line 52 for regeneration of the first desiccant cartridge 101 and, accordingly, by the first outlet line 51 for regeneration of the second desiccant cartridge 102. However, the pressurized air can also be taken from the multi circuit protection valve assembly 5 and the consumers circuits 4 connected to the supply outlet 21, which offers a regeneration phase of the desiccant cartridge 101 or 102 depending on the position of the first and second toggling valve 121, 122.

Thus by switching the regeneration solenoid valve 8 in its ON position, the regeneration of the passive desiccant cartridge 102 or 101 is started, thereby regenerating the passive desiccant cartridge and discharging the wet or humidified air via the toggling valve 122 or 121, which is open in its regeneration direction.

A purge valve 126 is realized as a pneumatically controlled 2/2 valve, with a blocking basic position and a pneumatic control port 126*a*, which is controlled by the output of the governor solenoid valve 9, which in turn is electrically controlled by the third control signal, i.e. the governor control signal S3. If S3=0 the governor solenoid valve 9 is in its blocking basic position. If S3=1, the governors solenoid valve 9 switches into its open position, thereby connecting the supply outlet 21 to the pneumatic control port 126*a* and switching the purge valve 126 into its open position, thereby connecting the supply inlet port 11 via the open purge valve 126 to the exhaust outlet 30 (via the silencer 125).

If the system pressure p21 at the supply outlet 21 reaches a cut-out pressure p21_max, the ECU outputs the electrical governor control signal S3, i.e. S3=1, thereby switching the governor solenoid valve 9 into its open position. Therefore, a pneumatic unloader signal p40 is delivered to the pressure input 126*a* of the purge valve 126 and switches the purge valve 126 into its open position, in which the compressed air supplied by the compressor 2 into the supply inlet port 11 is directly passed to the exhaust outlet 30. Thus the supplied compressed air is directly unloaded to atmosphere. Further, the compressor control outlet 40 outputs the pneumatic unloader signal p40 to the unloader port 2a of the compressor 2, thereby switching the compressor 2 into its off-load mode. Preferably the purge valve 126 itself or a purge valve area around the purge valve 126 can be electrically heated by an electrical heater device 127, in order to avoid freezing of the purge valve 126 or the purge valve area.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

LIST OF REFERENCE NUMERALS (PART OF THE DESCRIPTION)

1 twin chamber air dryer
2 compressor
2a unloader port
3 pneumatic consumer system
4 consumer circuits
5 multi circuit protection valve assembly
6 solenoid valve assembly
7 direction control solenoid valve
8 regeneration solenoid valve
9 governor solenoid valve
7a, 8a, 9a electrical control ports
10 electronic control unit, ECU
11 supply inlet port
12 external supply inlet port
14 system pressure storage
20 commercial vehicle
21 supply outlet
22 pneumatic system
25 engine shaft
30 exhaust outlet
31 safety valve outlet
32 safety valve
40 compressor control outlet
41 first air dryer line
42 second air dryer line
45 pressure sensor
46 second casing
47 first casing
48 regeneration line
51, 52 outlet line
53 exhaust line
101 first desiccant cartridge
102 second desiccant cartridge
121 first toggling valve
122 second toggling valve
121a, 122a pneumatic control port of the toggling valve 121, 122
125 silencer
126 purge valve
126a pneumatic control port of the purge valve 126
127 heater device
131, 132 system non-return valves
141,142 regeneration check valves
S1 electrical direction control signal
S2 electrical regeneration control signal
S3 electrical governor control signal
S4 electrical pressure control signal
p11 inlet pressure at the supply inlet port 11
p21 system pressure at the supply outlet 21
p21_max cut-out pressure
p40 pneumatic unloader signal

What is claimed is:

1. A twin chamber air dryer for a pneumatic system of a commercial vehicle, said twin chamber air dryer comprising:
a supply inlet port to be connected to a compressor, a supply outlet for supplying dried compressed air to a pneumatic consumer system, a compressor control outlet for delivering a pneumatic unloader signal, an exhaust outlet,
a first desiccant cartridge and a second desiccant cartridge, to be operated alternately,
a toggling valve assembly for switching between said first desiccant cartridge and said second desiccant cartridge,
a pneumatically controlled purge valve switchable between a blocking basic position and an activated position for connecting said supply inlet port to said exhaust outlet, and a solenoid valve assembly, said solenoid valve assembly comprising:
- a directional control solenoid valve for receiving an electrical direction control signal and controlling said toggling valve assembly,
- a regeneration solenoid valve for receiving an electrical regeneration control signal and providing pressurized air in regeneration phases of said first and second desiccant cartridges, and
- a governor solenoid valve for receiving an electrical governor control signal, controlling said purge valve, and outputting said pneumatic unloader signal,
- wherein each of said direction control solenoid valve, said regeneration solenoid valve, and said governor solenoid valve can be operated independently by said electrical direction control signal, said electrical regeneration control signal, and said electrical governor control signal.

2. The twin chamber air dryer according to claim 1, wherein each desiccant cartridge is operable in an on-load phase, a regeneration phase and a passive phase, respectively.

3. The twin chamber air dryer according to claim 1, further comprising a safety valve for releasing an inlet pressure at said supply inlet port.

4. The twin chamber air dryer according to claim 1, wherein said toggling valve assembly comprises:
- a pneumatically controlled first toggling valve connected to said first desiccant cartridge;
- and a pneumatically controlled second toggling valve connected to said second desiccant cartridge;
- wherein said first toggling valve is pneumatically controlled by said directional control solenoid valve and said second toggling valve is controlled by a pneumatic signal coming from said first desiccant cartridge.

5. The twin chamber air dryer according to claim 4, wherein said first toggling valve and said second toggling valve are 3/2 valves, which are each biased into an open basic position for an on-load phase and activated into a closed position for a regeneration phase, respectively.

6. The twin chamber air dryer according to claim 1, wherein a system double check valve is provided, comprising two non-return valves which are connected to said supply outlet.

7. The twin chamber air dryer according to claim 1, wherein said pneumatic unloader signal delivered by said governor solenoid valve is:
- output at said compressor control outlet, for controlling a compressor mode, and
- further fed to a pneumatic control port of said purge valve, wherein said purge valve is provided for short-connecting said supply inlet port to said exhaust outlet in dependence of said pneumatic unloader signal.

8. The twin chamber air dryer according to claim 1, wherein a heater device is provided for electrically heating at least said purge valve and/or an area around said purge valve, in order to avoid freezing of at least said purge valve and/or the area around said purge valve.

9. The twin chamber air dryer according to claim 1, wherein a silencer is installed on an exhaust line to reduce noise during discharge of compressed air via said purge valve.

10. The twin chamber air dryer according to claim 1,
- wherein said regeneration solenoid valve is provided for controlling a regeneration phase of said first desiccant cartridge and a regeneration phase of said second desiccant cartridge,
- wherein said regeneration solenoid valve is pressurizing a regeneration line in dependence of said electrical regeneration control signal,
- said regeneration line being connected to said first and second desiccant cartridges via a first regeneration check valve and a second regeneration check valve, respectively.

11. The twin chamber air dryer according to claim 1, wherein at least one of said direction control solenoid valve, said regeneration solenoid valve, and said governor solenoid valve is an electrically controlled 3/2 valve, connected with an electrical control port to said electronic control unit,
- wherein said electrically controlled 3/2 valve is biased into a blocking basic position, to be switched into an open position by said electrical direction control signal, said electrical regeneration control signal, or said electrical governor control signal, respectively.

12. The twin chamber air dryer according to claim 1, comprising
- a first casing housing said pneumatically controlled valves and
- a triple block solenoid casing housing said direction control solenoid valve, said regeneration solenoid valve, and said governor solenoid valve,
- wherein said triple block solenoid casing is connected to said first casing, and
- wherein pneumatic connections between said first casing and said triple block solenoid casing are realized by openings in said first casing and said triple block solenoid casing and by sealings between said first casing and said triple block solenoid casing.

13. A pneumatic system for a commercial vehicle, said pneumatic system comprising:
- a twin chamber air dryer according to claim 1,
- an electronic control unit for outputting said electrical control signals to said solenoid valve assembly,
- a pneumatically controlled compressor supplying said supply inlet port with compressed air and being pneumatically controlled by said unloader signal coming from said compressor control outlet, and
- a pneumatic consumer system for receiving dried pressurized air from said supply outlet and providing compressed dried air for said regeneration phases of said first and second desiccant cartridges, wherein a pressure sensor is provided at said supply outlet or in said pneumatic consumer system,
- said pressure sensor outputting a sensor signal to said electronic control unit.

14. A commercial vehicle comprising a pneumatic system according to claim 13.

* * * * *